Patented Oct. 30, 1951

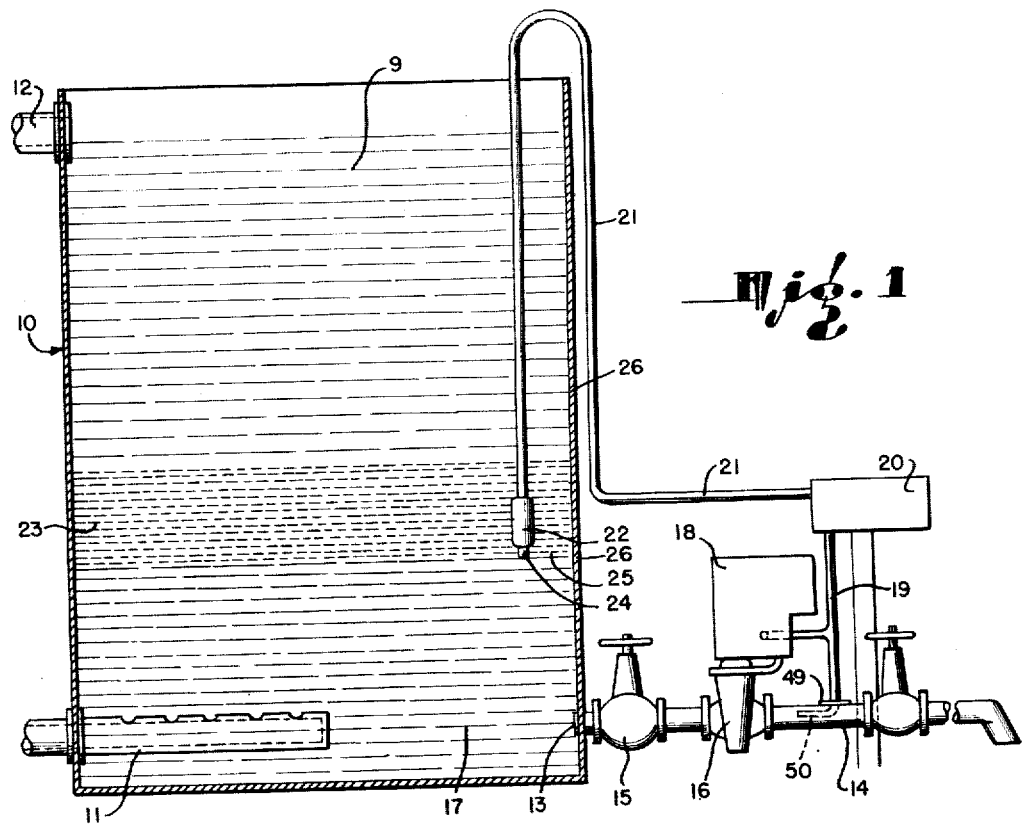

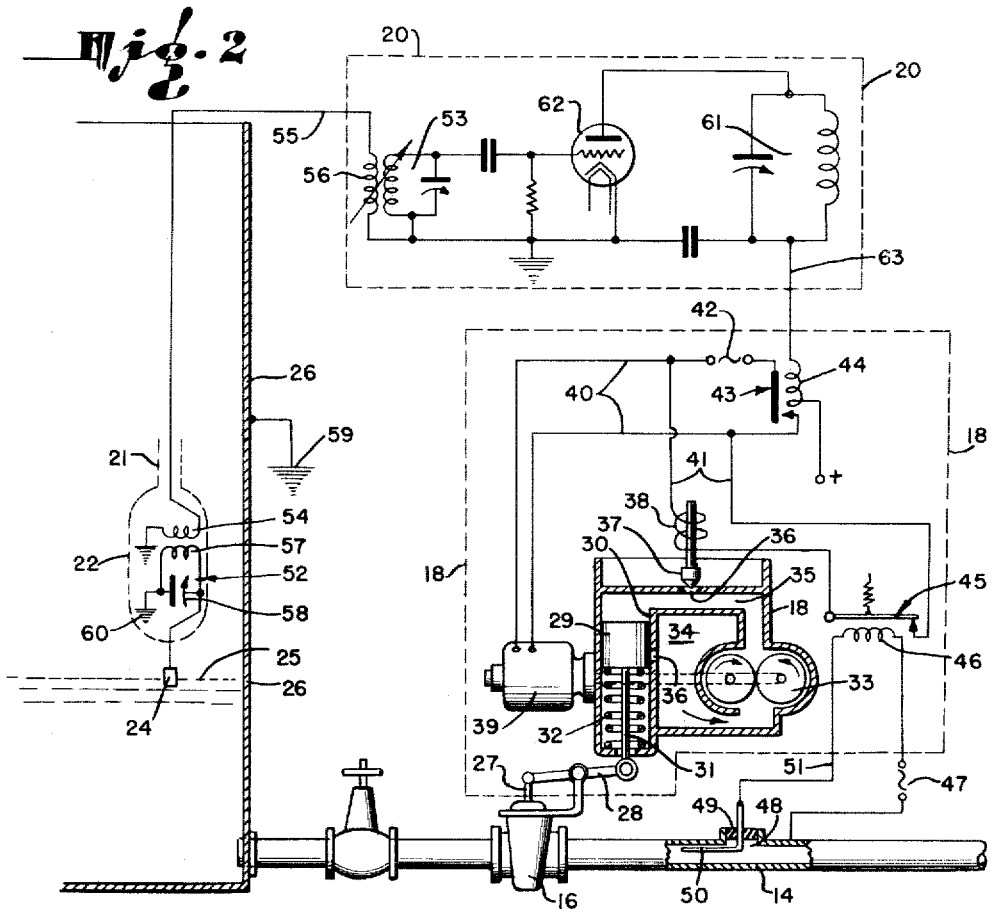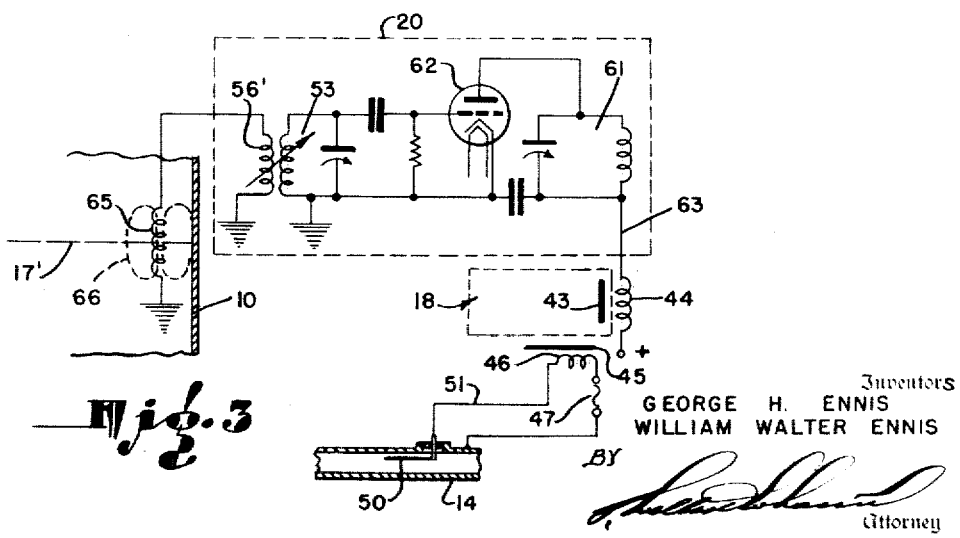

2,573,172

UNITED STATES PATENT OFFICE 2,573,172

TANK BLEEDER

George H. Ennis and William Walter Ennis, Long Beach, Calif.; said William Walter Ennis, assignor to Robert V. Funk, Long Beach, Calif.

Application November 1, 1947, Serial No. 783,598

8 Claims. (Cl. 137—68)

Our present invention relates to means for regulating the quantity of a liquid or liquids in containers such as tanks, and relates in particular to a means and method for controlling the level of water or aqueous solution in tanks employed in the oil industry.

In the oil industry many tanks and vessels are used, such tanks containing more than one type of fluid. These fluids may be gas, liquid hydrocarbons, and some treating fluid or water. A typical case is the gathering tank used in the oil field to receive the oil and water product from a number of wells. In this gathering tank a large portion, if not all, of the water settles out, accumulating at the bottom of the tank. The water is bled off from the bottom of the tank and the oil and/or oil and water mixture or emulsion is taken from the upper portion of the tank. In many of these tanks it is desirable to maintain the oil-water interplane at a predetermined point. For example, in treating tanks, it is desirable to maintain a quantity of the aqueous treating solution in the bottom of the tank so that it may contact the incoming oil and water mixture and facilitate the agglomeration of the small water droplets into drops sufficiently large to settle out from the oil. Herein, we employ the term "water" to indicate water or aqueous treating solutions which are used or accumulate in tanks employed in the oil industry.

It is an object of the invention to provide a device for automatically controlling the quantity of a fluid in a container, which device, for the purpose of control, utilizes the oscillator field modifying characteristics of the fluid.

In the practice of the invention we employ an oscillator circuit, including an inductance and a capacitance. The electrodes or plates of the capacitor employed in the oscillator circuit produces in the intervening and/or adjacent space an electrostatic field which may be modified by a liquid or fluid entering this field, in accordance with the characteristics of the liquid or fluid, this modification of the capacitance field changing the electrical characteristics of the oscillator circuit. Likewise, the inductance of the oscillator circuit produces an electrostatic field, or utilizes a field or space constituting the electromagnetic circuit. This field is capable of modification by liquids and/or fluids which are brought into or into operative proximity to the field. In the practice of our invention, the oscillator circuit is arranged so that at least one of these fields of the oscillator circuit is placed at or near the level in the tank desired for one of the liquids or fluids to be controlled. For example, in a tank which receives oil and water, our invention may be arranged so as to control the flow of at least one of the liquids so as to maintain the interplane or oil-water contact at a predetermined level within the tank.

It is a further object of the invention to provide a method and apparatus for controlling the level, quantity and/or strength of fluids in containers by utilizing the oscillator field modifying characteristics of fluids to control the flow of fluids through openings of containers. The invention may be used a number of different ways. For example, if there is a constant flow of fluid into a container, the quantity of the fluid maintained in the container may be regulated by employment of the invention to regulate the outflow of fluid from the container. Also, the invention may be employed to control the strength of a solution or suspension or mixture of fluids. For example, in a tank containing water, a chemical solution may be formed by the adding of chemicals thereto under control exercised by the use of the invention, the chemicals being added until the oscillator field modifying characteristics of the solution and/or suspension is given a predetermined oscillator field modifying quality or characteristic.

It is an object of the invention to provide a method and apparatus for determination of the position of and controlling the level of an interfacial layer of water, oil-water emulsion and oil in a storage tank, separating tank, or treatment tank, the invention being capable of taking care of heavy surges of liquid as well as exerting control under normal conditions of operation.

Further objects and advantages of the invention will be brought out in the following part of the specification, wherein we have shown simple embodiments of the invention for the purpose of disclosing the details of an operative device without placing limitation on the scope of the invention defined in the appended claims.

Referring to the drawings which are for illustrative purposes only,

Fig. 1 is a schematic elevational view showing an oil separation tank equipped with one form of our invention.

Fig. 2 is a schematic view showing the details of electrical and mechanical elements employed in the form of the invention shown in Fig. 1.

Fig. 3 is a diagram showing a form of the invention responsive to the inductance or electromagnetic field modifying quality of a fluid.

For the purpose of exemplifying an important utility of the invention, we have, in Fig. 1, shown an oil and water separating tank 10 having an inlet 11 for oil and water near its bottom and having an outlet 12 near its top, designated as the oil outlet. On the opposite side of the tank 10 from the inlet 11, there is a water outlet 13 to which water disposal piping 14 is connected, this piping 14 having therein a shut-off valve 15 which is normally open during the operation of the invention, and a motor operated valve 16 arranged to be automatically opened and closed in accordance with the changes in level in the body of water 17 in the tank 10, so as to maintain the height of the water level within a given range.

The power operated valve 16 has an operating unit 18 connected by a conduit 19 with an electronic control unit 20. From the control unit 20, a conduit 21 is extended up along the side of the tank 10 and then down into the tank 10 to support therein at a desired level the sensing unit 22 forming part of our invention.

The liquid mixture which enters the tank 10 through the inlet 11 ordinarily contains free oil and water and emulsion of oil and water. Accordingly, upon the surface of the body of water 17 a layer of emulsion 23 is shown, surmounted by a body of oil 9. The sensing unit includes a depending electrode 24 and the control device of our invention is in the present instance adjusted so that when the level of the water 17 rises so as to bring into the space 25 between the electrode and the metal wall 26 of the tank 10, a mixture of oil and water containing ninety per cent water, the valve 16 will be automatically opened, permitting drainage of water from the tank 10 until the mixture or emulsion of oil and water occupying the space 25 contains thirty-five per cent water. It will be perceived, accordingly, that the device is quite sensitive. Furthermore, it may be here explained that the valve 16 and the piping 14 are capable of rapidly carrying off water so that there is ample drainage capacity to accommodate surges of liquid into the tank 10, which sometimes occur.

In Fig. 2 the elements of the preferred embodiment of the invention are shown. The valve 16 is shown with a valve stem 27 arranged to be moved vertically by a lever 28. This lever 28 is connected with a piston 29 operative in a cylinder 30, the connection of the lever 28 with the piston 29 comprising a piston rod 31. A spring 32 is arranged in engagement with the piston 29 so as to lift the piston 29 and rotate the lever 28 in counterclockwise direction when there is no pressure of fluid in the upper part of the cylinder 30, thereby moving the valve stem 27 downward and closing the valve 16. The unit 18 further includes a hydraulic pump 33, shown as a gear pump, arranged to force oil from a reservoir 34 and through a duct 35 into the upper end of the cylinder 30. This duct 35 has a pressure releasing valve port 36 arranged to be closed by a solenoid operated valve 37, when the coil 38 is energized. The pump 33 is arranged to be driven by an electric motor 39 and means are provided for simultaneously electrically energizing the solenoid coil 38 and the motor 39 so that when the pump 33 is operated, the valve 37 will be normally closed and the pressure of fluid from the pump 33 will be transmitted through the duct 35 into the upper part of the cylinder 30, to force the piston 29 downward, thereby rotating the lever 28 in clockwise direction and opening the valve. For this purpose, we employ a motor circuit 40 and a valve circuit 41 connected in parallel to a source 42 of electric current through a relay 43 which is closed when its electromagnetic coil 44 is energized. The valve operating circuit 41 has in series therewith a relay 45 which is closed when its coil 46 is energized from a source 47 of current.

The relay 45 forms part of an auxiliary control for accomplishing closure of the valve 16 when oil starts to flow through the outlet piping 14. The piping 14 is provided with a port 48 closed by a body 49 of insulating material, which supports within the piping 14 an electrode 50 spaced relatively close to the upper wall of the piping 14. The electrode 50 is connected with the coil 46 of the relay 45 by a conductor 51, and the source of electric current 47 connects the coil 46 and the piping 14 in series. When water fills the piping 14, the coil 46 of the relay 45 will be energized for the reason that current will flow through the water from the electrode 50 to the wall of the piping 14. Should the level of the water 17 in the tank 10 drop to such level as to permit oil to flow out through the upper portion of the piping 14, this oil will displace water from between the electrode 50 and the wall of the piping 14, thereby interrupting the flow of current through the coil 46 and opening the relay 45. The opening of the relay 45 will deenergize the solenoid coil 38, thereby removing the closing force from the valve 37, permitting it to open, and allow oil pressure to escape from the upper end of the cylinder 30 through the port 36, this release of pressure from the cylinder 30 permitting the spring 32 to close the valve 16, thereby preventing further escape of oil through the water outlet piping 14.

The sensing unit 22 includes an oscillator circuit 52, inductance coupled with an oscillator circuit 53, this coupling including inductance means 54 connected by an insulated conductor 55 which extends through the conduit 21, with the inductance 56 associated with the oscillator circuit 53. The oscillator circuit 52 includes within the casing of the sensing unit 22 an inductance 57 and a capacitor 58. The oscillator circuit 52 has also a capacitor arranged externally of the casing of the unit 22, consisting of the electrode 24 and the wall 26 of the tank. The wall 26 is connected with the capacitor 58 and the inductance 57 of the oscillator circuit 52 by ground connections 59 and 60. The space 25 between the parts 24 and 26, which constitute spaced condenser plates, constitutes an oscillator field adapted to be modified in accordance with the field modifying quality or characteristic of the fluid occupying the space 25. Otherwise stated, the space 25 constitutes an electrostatic condenser field between the condenser plate elements 24 and 26 of the oscillator circuit 52.

To furnish power for the operation of the relay 43, an oscillator circuit 61 is coupled with the oscillator circuit 53 through a triode 62, this oscillator circuit 61 being connected to the coil 44 of the relay 43 through a conductor 63. It will be perceived that the current value of the power supplying oscillator circuit 61 will be varied proportionately, although not linearly so, to the field modifying quality of the liquid occupying the space 25, since variations in the capacitance of the condenser formed by the plates 24 and 26 varies the frequency of the oscillator circuit 52 which, as hereinbefore explained, is coupled with the oscillator circuit 61 so as to exercise a control thereover. Otherwise explained, the electronic equipment of the units 22 and 22 is so arranged that the current drawn by the equipment is proportional, although not linearly so, to the apparent specific inductive capacitance of the liquid surrounding the capacitor electrode 24 and/or occupying the space 25.

In the form of the invention shown in Figs. 1 and 2, we have shown the manner in which we use as a primary control an oscillator field consisting of the capacitance field of a capacitor forming part of an oscillator circuit 52. Our invention also comprehends as a sensing means for the control of the electronic equipment an oscillator field consisting specifically of an oscillator circuit coupled either directly or indirectly therewith. This alternative practice of the invention is illustrated schematically in Fig. 3, wherein we have shown the control unit 20 including, as in Fig. 2, the oscillator circuit 61, coupled through a thermionic tube 62 with an oscillator circuit 53. At this point we depart from the disclosure of Fig. 2. Instead of coupling the oscillator circuit 53 with an oscillator circuit 52, we couple the oscillator circuit 53 of Fig. 3 by a variable inductance 56' with an inductance coil 65 suspended in the tank 10. As indicated by dotted lines 66, this coil 65 has an electromagnetic or inductance field. In view of the inductance coupling of the coil 65 with the oscillator 53, the coil 65 is in effect an inductance of the oscillator 53, and self-induction therein varies the action of the oscillator 53 and of the remaining electronic equipment of the control unit 20 of Fig. 3. As the water level 17' rises and falls with relation to the inductance 65, the current drawn through the coil 44 of the relay 43 varies, and as the current strength in the coil 44 rises and falls with relation to a predetermined strength, the relay 43 opens and closes, thereby controlling the power unit 18 associated with the valve 16 in the manner previously described herein with relation to Figs. 1 and 2.

We claim as our invention:

1. In means for automatically bleeding water from a tank which receives oil and water, said tank having an opening, valve means for controlling the flow of water through said opening, and electrically controlled motor means for operating said valve means, the combination of: an oscillator circuit having an inductance field and a capacitance field, arranged so that at least one of said fields may be placed in a position with relation to the water of said tank wherein said last named field will be modified by said water; means responsive to electrical changes in said oscillator circuit as the result of modification of said field by said water for controlling the operation of said motor means; and electrical means acting in response to a flow of oil through said opening to control said motor means so as to close said valve.

2. In means for automatically bleeding water from a tank which receives oil and water, said tank having an opening, valve means for controlling the flow of water through said opening, and electrically controlled motor means for operating said valve means, the combination of: an oscillator circuit having an inductance field and a capacitance field, arranged so that at least one of said fields may be placed in a position with relation to the water of said tank wherein said last named field will be modified by said water; means responsive to electrical changes in said oscillator circuit as the result of modification of said field by said water for controlling the operation of said motor means; and electrical means acting in response to a flow of oil through said opening to close said valve means.

3. In means for automatically bleeding water from a tank which receives oil and water, said tank having an opening, valve means for controlling the flow of water through said opening, and electrically controlled motor means for operating said valve means, the combination of: an oscillator circuit having a capacitance field and an inductance field arranged so that at least one of its fields may be placed in a position with relation to the water of said tank wherein said last named field will be modified by said water; means responsive to electrical changes in said oscillator circuit as the result of modification of said field by said water for controlling the operation of said motor means; and electrically controlled means acting in response to a flow of oil through said opening to control flow through said opening independently of the control exercised by said oscillator circuit.

4. In means for automatically bleeding water from a tank which receives oil and water, said tank having an opening, valve means for controlling the flow of water through said opening, and electrically controlled motor means for operating said valve means, the combination of: an oscillator circuit having a capacitance field and an inductance field arranged so that at least one of its fields may be placed in a position with relation to the water of said tank wherein said last named field will be modified by said water; means responsive to electrical changes in said oscillator circuit as the result of modification of said field by said water for controlling the operation of said motor means having an electrical sensing element below said last named field; and means acting in response to a fluid of greater resistance than water engaging the same, to control flow through said opening.

5. In means for automatically bleeding water from a tank which receives oil and water, said tank having an opening, valve means for controlling the flow of water through said opening, and electrically controlled motor means for operating said valve means, the combination of: an oscillator circuit having a capacitor formed by the wall of said tank and a condenser plate spaced from said wall so as to form a capacitance field between said wall and said plate into which said water may enter and thereby modify said field; means responsive to electrical changes in said oscillator circuit as the result of modification of said field by said water for controlling the operation of said motor means; and electrical means acting in response to oil in a level below said condenser plate to control said motor means so as to close said valve means.

6. In means for automatically bleeding water from a tank which receives oil and water, said tank having an opening, valve means for controlling the flow of water through said opening, and electrically controlled motor means for operating said valve means, the combination of: an oscillator circuit having an inductance field and a capacitance field, arranged so that at least one of said fields may be placed in a position with relation to the water of said tank wherein said last named field will be modified by said water; means responsive to electrical changes in said oscillator circuit as the result of modification of said field by said water for controlling the operation of said motor means; and emergency shut-off means for said opening comprising a circuit having a source of electrical energy, circuit closing means below said last named field closing said circuit in consequence of the water in said tank being above a predetermined level and opening said circuit when said water drops below said predetermined level, and means operating in response to opening of said circuit to reduce flow through said opening.

7. In means for automatically bleeding water from a tank which receives oil and water, said tank having an opening, valve means for controlling the flow of water through said opening, and electrically controlled motor means for operating said valve means, the combination of: an oscillator circuit having an inductance field and a capacitance field, arranged so that at least one of said fields may be placed in a position with relation to the water of said tank wherein said last named field will be modified by said water; means responsive to electrical changes in said oscillator circuit as the result of modification of said field by said water for controlling the operation of said motor means; and emergency shut-off means for said opening comprising a circuit having a source of electrical energy, circuit closing means below said last named field comprising spaced electrode means connected by water when the water in said tank is above a predetermined level in said tank, thereby closing said circuit, and opening said circuit when said water drops below said predetermined level, and means operating in response to opening of said circuit to reduce flow through said opening.

8. In means for automatically bleeding water from a tank which receives oil and water, said tank having an opening, valve means for controlling the flow of water through said opening, and electrically controlled motor means for operating said valve means, the combination of: an oscillator comprising an oscillating plate circuit and an oscillating grid circuit connected through an electronic tube; an energizing circuit for energizing said oscillator, said circuit comprising a source of electrical energy; a sensing circuit inductively coupled to said grid circuit, said sensing circuit having a capacitor field element adapted to be disposed in a position wherein its field will be modified by fluid in said tank so as to accomplish a change in the current drawn by said oscillator through said energizing circuit; means coupled with said energizing circuit and operating in response to change in the flow of electrical energy in said energizing circuit to actuate said valve means; and means having an electrical sensing element adapted to be positioned below said capacitor field element acting in response to fluid of greater resistance than water engaging the same, to control the flow through said opening.

GEORGE H. ENNIS.
WILLIAM WALTER ENNIS.

REFERENCES CITED

The following references are of record in the file of this patent:

UNITED STATES PATENTS

| Number | Name | Date |
| --- | --- | --- |
| 2,300,562 | Freystedt | Nov. 3, 1942 |
| 2,354,964 | Ostermann | Aug. 1, 1944 |
| 2,433,599 | Cohen | Dec. 30, 1947 |

Certificate of Correction

Patent No. 2,573,172 October 30, 1951

GEORGE H. ENNIS ET AL.

It is hereby certified that error appears in the printed specification of the above numbered patent requiring correction as follows:

Column 6, lines 36 and 37, strike out "having an electrical sensing element below said last named field" and insert the same in line 38 after "means"; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*